(12) United States Patent
Shirasu et al.

(10) Patent No.: US 7,287,864 B2
(45) Date of Patent: *Oct. 30, 2007

(54) LIGHT AMOUNT ADJUSTING DEVICE AND PROJECTOR USING THE SAME

(75) Inventors: Masahide Shirasu, Kai (JP); Kazuhiro Fukasawa, Minami-Alps (JP); Akira Hakozaki, Kai (JP); Sumio Takeuchi, Kofu (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 246 days.

This patent is subject to a terminal disclaimer.

(21) Appl. No.: 11/132,327

(22) Filed: May 19, 2005

(65) Prior Publication Data
US 2006/0203210 A1 Sep. 14, 2006

(30) Foreign Application Priority Data
Mar. 10, 2005 (JP) .............................. 2005-067401

(51) Int. Cl.
G03B 21/14 (2006.01)
(52) U.S. Cl. ....................................................... 353/97
(58) Field of Classification Search .................. 353/85, 353/88, 91, 97; 396/505–510
See application file for complete search history.

(56) References Cited
U.S. PATENT DOCUMENTS
4,349,264 A * 9/1982 Tezuka et al. .............. 396/464
5,537,166 A * 7/1996 Keelan et al. ................ 353/97
5,671,993 A * 9/1997 Shikama ...................... 353/77
5,729,783 A * 3/1998 Depatie et al. ............. 396/508
2006/0203210 A1* 9/2006 Shirasu et al. ................ 353/97
2006/0290901 A1* 12/2006 Moriyama et al. ............ 353/97
2007/0046905 A1* 3/2007 Takeuchi et al. .............. 353/97
2007/0153238 A1* 7/2007 Takeuchi et al. .............. 353/97

\* cited by examiner

Primary Examiner—William C. Dowling
(74) Attorney, Agent, or Firm—Manabu Kanesaka

(57) ABSTRACT

A light amount adjusting device is assembled in a projector having a light source and a projection device projecting light from the light source on a screen through an image forming panel. The light amount adjusting device is arranged in the projection device or between the light source and the projection device. The light amount adjusting device includes a substrate having an optical path opening so that light from the light source passes therethrough; a blade member for adjusting quantity of light passing through the optical path opening; and a driving device for opening and closing the blade member. The blade member includes a base member formed of a polyimide sheet or a polyester sheet having heat resistance withstanding heat of the light source. A light blocking material is laminated on the base member. Accordingly, it is possible to provide the light amount adjusting device with a simple structure and easy assembly and the projector using the same capable of reducing deformation of the blade member due to heat and precisely adjusting amount of light without an influence of the deformation.

16 Claims, 10 Drawing Sheets

LIGHT AMOUNT ADJUSTING DEVICE AND PROJECTOR USING THE SAME

BACKGROUND OF THE INVENTION AND RELATED ART STATEMENT

1. Field of the Invention

The present invention relates to a light amount adjusting device for adjusting brightness and contrast of an image when a light source irradiates an image formed by an image forming device such as a Braun tube or a liquid crystal panel so that the image is projected on a screen through a projecting lens. The present invention also relates to a projector using the light amount adjusting device.

2. Description of the Prior Art

In a projector, an image such as a symbol and a picture is formed on an image forming device such as a Braun tube (i.e., CRT) or a liquid crystal panel, and a light source such as a halogen lamp irradiates the image, so that a projecting lens projects the image on a screen. The projector projects a still image such as a symbol image on a screen for a presentation, or a motion picture on a screen of a home theater system.

When such a projector is used in a rear projection television or a home theater system to project a movie requiring for a change of brightness in a wide range, it is possible to properly adjust brightness of an image of the movie. For example, the brightness may be reduced for a dark image and increased for a bright image to increase contrast, thereby obtaining a profound image.

When an image becomes bright and dark repeatedly, that is, brightness changes for every one several tenth seconds, a viewer may suffer eye fatigue and receive an optical stimulus, thereby causing a physical problem. Accordingly, it is necessary to adjust quantity of light for every frame of continuous images for reducing the stimuli on the eyes.

Patent Reference 1 (Japanese Patent Publication (Kokai) No. 2003-241311) has disclosed a conventional device for adjusting light quantity. In the reference, light from a light source is divided into three primary colors R, G and B through a dichroic mirror. When light is irradiated on an image forming panel such as a liquid crystal panel, a light quantity reducing device is arranged between the light source and the dichroic mirror. In the projector disclosed in the reference, light from the light source is divided into the three primary colors R, G and B, and the primary colors are irradiated on the image forming panels each formed of the liquid crystal panel. A projecting lens focuses light passing through the panels and projects an image on an outside screen.

As a method of forming an image, other than the liquid crystal panel, there is known a method (a CRT projector) in which a Braun tube emits scanning lines, or a digital imaging method (a digital light processing projector) in which a fine mirror transforms beams of the three primary colors R, G and B into scanning lines. In the light quantity reducing device, a substrate having an optical path opening aligned with a center of an optical axis is arranged in an optical path from the light source to the mirror. A plurality of blades is sequentially overlapped at a circumferential edge of the optical path opening of the substrate, and is arranged to be rotatable.

The blades are attached to the circumferential edge of the optical path opening with a predetermined spacing, and contour edge portions thereof are overlapped in a scale shape. Further, the blades are arranged such that leading end portions thereof face the optical path opening. When the blades rotate around end portions thereof, the leading end portions cover the optical path opening from a large aperture to a small aperture. Such a structure is widely known as a light amount adjusting device for a camera.

When such a structure widely known in a camera device, in which the plural blades are arranged around the optical path opening and rotate to adjust an aperture of the optical path opening, is adopted in a projector such as a projector, the following problems may occur.

In a typical projector, a light source irradiates light on an image forming device, and an image formed on the image forming device is projected on a screen. Accordingly, heat of the light source affects a blade member arranged between the light source and the screen. Especially, a recent projector needs to be small and have high brightness. Accordingly, a metal halide lamp or a high pressure mercury lamp having high brightness is used as the light source, so that a temperature around the lamp may reach 200 degrees. In such a case, the blade member may be formed of a thin metal plate made of SUS. As a result, it is necessary to drive the blame member with large load, thereby making it difficult to operate the blame member uniformly and reduce an operation noise.

Figures 10A, 10B, 10C:
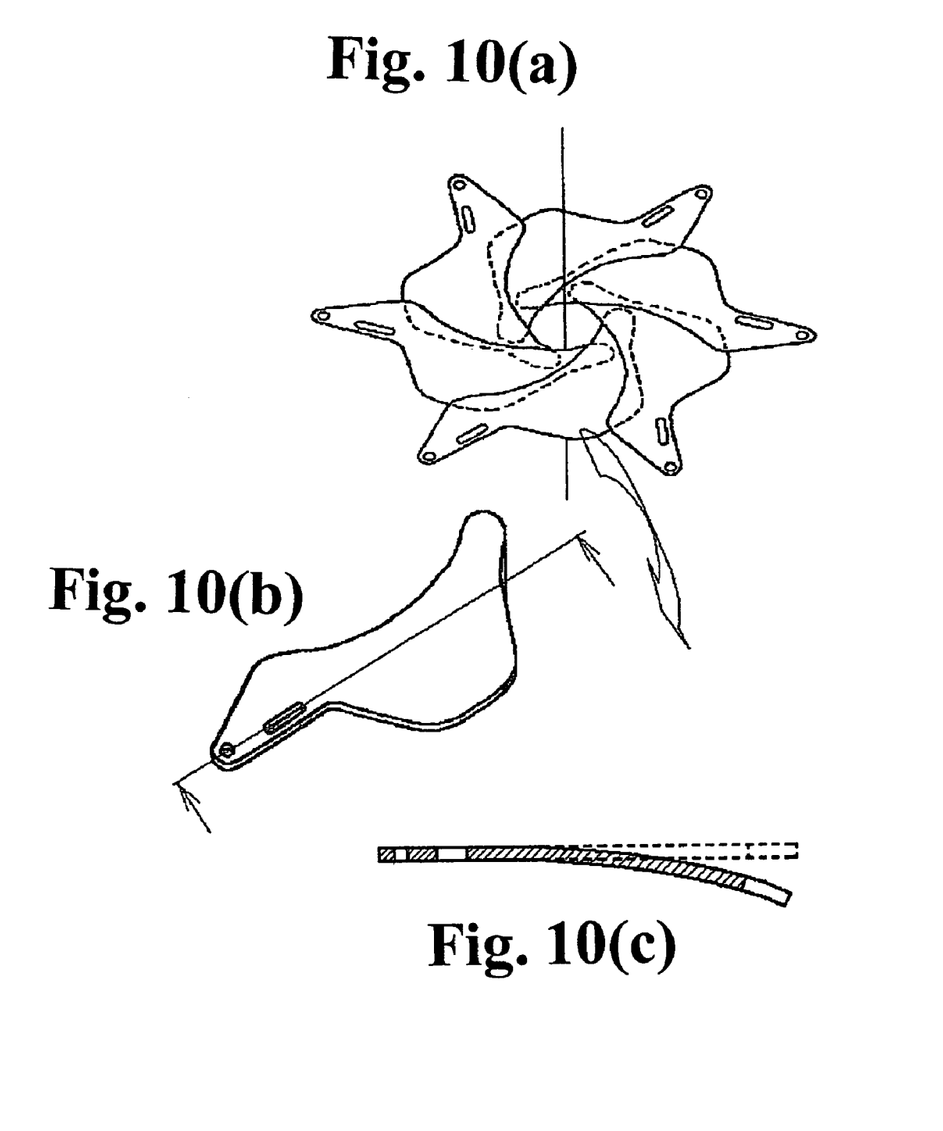

When a metal rolled plate made of SUS is punched out to form the blade member and the blade member is assembled in the projector, a tip portion of the blade member may be curved as shown in FIG. 10, thereby making it difficult to operate the blame member uniformly. In an extreme case, the blade members may bit each other, thereby making it difficult to adjust quantity of light.

In the field of camera devices, for example, as disclosed in Patent Reference 2 (Japanese Utility Model (Kokai) No. 58-168715), there is known a shutter blade of a camera in which titanium, a titanium alloy, aluminum, or an aluminum alloy is deposited on a translucent film such as a polyimide film and a polyester film. However, there is no disclosure regarding that such a blade may be used as a heat resistant blade relative to heat of a light source of a projector in place of the metal sheet blade in the conventional projector. When such a material is used for a blade member of a projector device, the material needs to withstand heat of a light source of the projector. However, there is no disclosure regarding heat resistance of the material. Further, there is no disclosure regarding a configuration of a light amount adjusting device of the projector.

OBJECT OF THE INVENTION

In view of the problems described above, an object of the present invention to provide a light amount adjusting device disposed in an optical device such as a projector, in which a temperature becomes high. In the invention, it is possible to reduce deformation of a blade member due to heat and a weight of the blade member, thereby making it possible to operate the blade member smoothly without a noise. Another object of the present invention is to provide a projector using the light amount adjusting device.

SUMMARY OF THE INVENTION

In order to obtain the objects described above, according to a first aspect of the present invention, a light amount adjusting device is assembled in a projector having a light source and a projection device projecting light from the light source on a screen through an image forming panel. The light amount adjusting device is arranged between the light source and the projection device. The light amount adjusting device includes a substrate having an optical path opening so that light from the light source passes therethrough; a blade member for adjusting quantity of light passing through the optical path opening; and a driving device for opening and closing the blade member. The blade member includes a base member formed of a polyimide sheet or a polyester sheet having heat resistance withstanding heat of the light source. A light blocking material is laminated on the base member.

According to a second aspect of the present invention, in the first aspect, the light blocking material includes a black coating coated on at least one surface of a heat resistant sheet.

According to a third aspect of the present invention, in the second aspect, the light amount adjusting device is disposed in the projection device.

According to a fourth aspect of the present invention, in the first aspect, the light blocking material includes a metal layer such as copper coated on at least one surface of a heat resistant sheet.

According to a fifth aspect of the present invention, in the fourth aspect, the light blocking material includes the metal layer such as cupper coated on at least one surface of the heat resistant sheet. The metal layer is coated with a polyimide resin, a polyester resin, an oxide layer such as nickel oxide, or a black coating.

According to a sixth aspect of the present invention, in the fourth aspect, the metal layer of the light amount adjusting device faces the light source, and the light amount adjusting device is arranged to face the light source.

According to a seventh aspect of the present invention, in the first aspect, the light amount adjusting device includes a transmission member rotatably supported on the substrate and having an opening arranged coaxially with the optical path opening and the blade member supported on the substrate and the transmission member for blocking the optical path opening of the substrate to adjust quantity of light.

According to an eighth aspect of the present invention, in the seventh aspect, the blade member includes a plurality of blade portions arranged and overlapped around a peripheral of the transmission member with a constant space therebetween. The blade portions are rotatably supported on the substrate with a predetermined space therebetween.

According to a ninth aspect of the present invention, in the seventh aspect, the blade member includes a plurality of blade portions arranged and overlapped around a peripheral of the transmission member with a constant space therebetween. A top one of the blade portions has a tip portion arranged below a tip portion of a bottom one of the blade portions.

According to a tenth aspect of the present invention, in the seventh aspect, the blade member is inclined toward a direction of light relative to a mounting surface of the transmission member.

According to an eleventh aspect of the present invention, in the first aspect, the light amount adjusting device includes a transmission member rotatably supported on the substrate to be movable outside the optical path opening and a pair of blade members supported on the substrate and the transmission member for blocking the optical path opening of the substrate in a vertical direction, a lateral direction, or a light direction to adjust quantity of light.

According to a twelfth aspect of the present invention, a projector includes a light source, a projection device for projecting light from the light source on a screen through an image forming panel, and a light amount adjusting device arranged in the projection device or between the projection device and the light source. The light amount adjusting device includes a substrate having an optical path opening so that light from the light source passes therethrough; a blade member for adjusting quantity of light passing through the optical path opening; and a driving device for opening and closing the blade member. The blade member includes a base member formed of a polyimide sheet or a polyester sheet having heat resistance withstanding heat of the light source. A light blocking material is laminated on the base member.

According to a thirteenth aspect of the present invention, in the twelfth aspect, the light blocking material includes a black coating coated on at least one surface of a heat resistant sheet.

According to a fourteenth aspect of the present invention, in the thirteenth aspect, the light amount adjusting device is disposed in the projection device.

According to a fifteenth aspect of the present invention, in the twelfth aspect, the light blocking material includes a metal layer such as copper coated on at least one surface of a heat resistant sheet.

According to a sixteenth aspect of the present invention, in the fifteenth aspect, the light blocking material includes the metal layer such as cupper coated on at least one surface of the heat resistant sheet. The metal layer is coated with a polyimide resin, a polyester resin, an oxide layer such as nickel oxide, or a black coating.

According to a seventeenth aspect of the present invention, in the fifteenth aspect, the metal layer of the light amount adjusting device faces the light source, and the light amount adjusting device is arranged to face the light source.

According to an eighteenth aspect of the present invention, in the twelfth aspect, the light amount adjusting device is arranged to change the optical path opening of the substrate between a fully opened state to a specific aperture to adjust quantity of light.

BRIEF DESCRIPTION OF THE DRAWING

FIG. 6 are explanatory views showing the light amount adjusting device, wherein

FIG. 7 are views showing a blade member of the device shown in FIG. 5, wherein

FIG. 8 are views showing a blade member different from that shown in FIG. 7, wherein

FIG. 10 are views showing a blade member of a conventional light amount adjusting device, wherein FIG. 10(*a*) is a view showing the blade member in an overlapped state, FIG. 10(*b*) is a view showing a shape of the blade member, and FIG. 10(*c*) is a sectional view showing the blade member.

DETAILED DESCRIPTION OF PREFERRED EMBODIMENT

Figure 1:
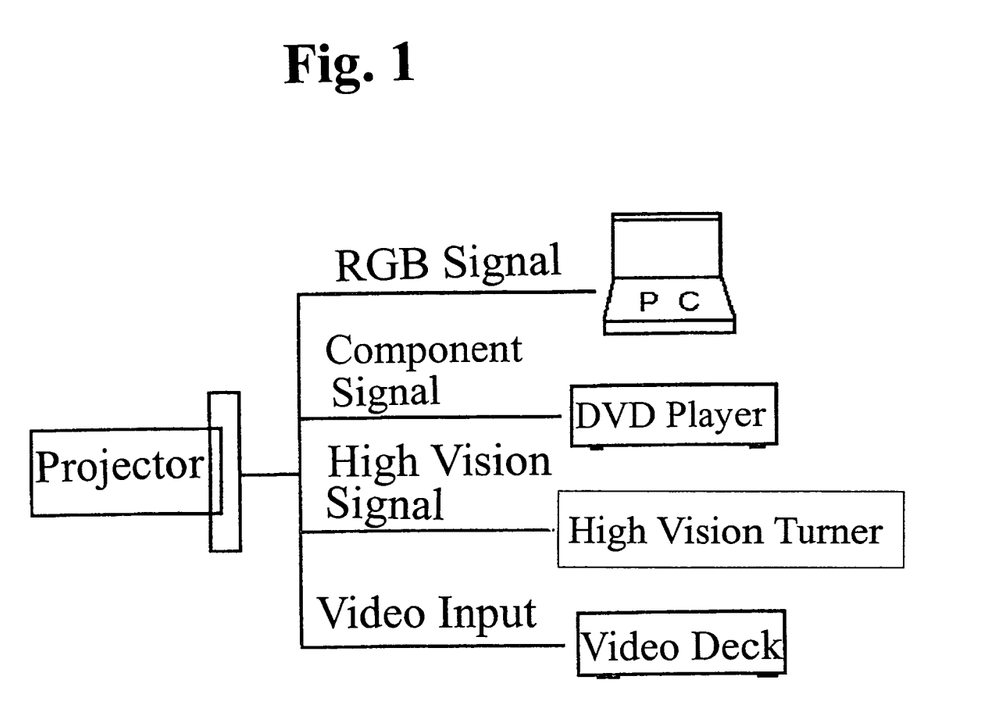
FIG. 1 is an explanatory diagram showing a system configuration of a projector according to an embodiment of the present invention.

Hereunder, embodiments of the present invention will be described with reference to the accompanying drawings. First, a projector provided with a light amount adjusting device of the invention will be described. FIG. 1 is an explanatory diagram showing a system configuration of a projector according to an embodiment of the present invention, and FIG. 2 is a schematic diagram of the projector according to the embodiment of the present invention.

A method of inputting images to a projector employs RGB signals, component signals, Hi-Vision signals, video signals and so on. The RGB signals are transmitted from the image output terminal of a computer, for example, to the projector. The component signals are transmitted to a DVD player. The Hi-Vision signals are transmitted to a tuner such as a Hi-Vision TV. The video signals are transmitted from the output terminal of a video deck or the like to a projector device. As the projector device, there are some known ones, one of those examples is shown in FIG. 2 in case a liquid crystal panel is used as an image forming unit (or image forming means).

Figure 2:
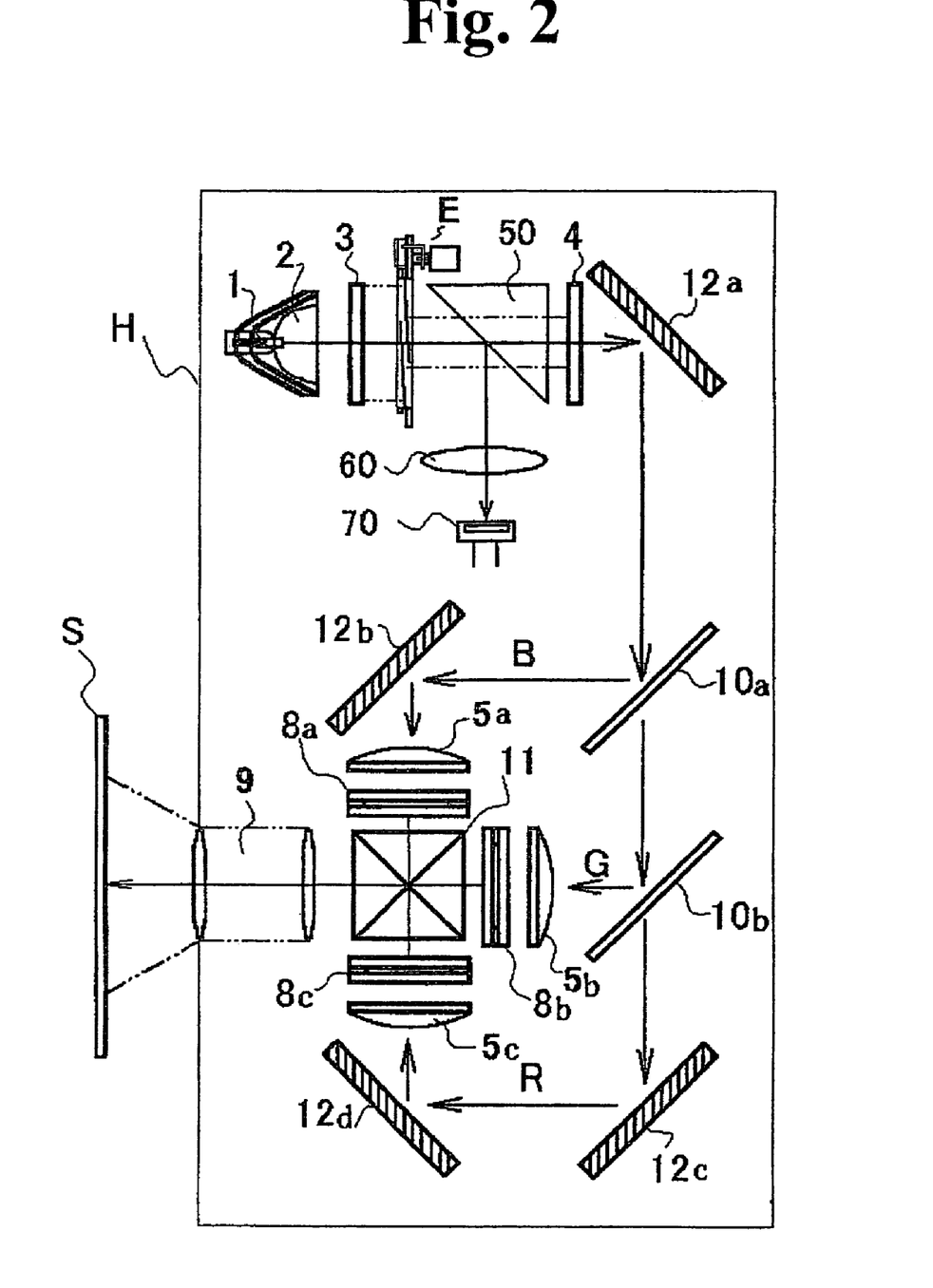
FIG. 2 is a schematic diagram of the projector according to the embodiment of the present invention.

In FIG. 2, symbol H designates a projector, and symbol S designates a screen for projecting an image. The projector H is provided with a projecting light source 1, which is exemplified by a light source lamp such as a metal halide lamp, a high-pressure mercury lamp, an NSH lamp, a xenon lamp or a VIP lamp. The light emitted from the light source 1 is reflected into a generally parallel light by a reflecting mirror 2 having an objective face, and detrimental/unnecessary infrared ray and ultraviolet ray are cut by a filter 3 formed of an integrator lens as a type of a lens allay. After this, the light is adjusted to optimum brightness by a light amount adjusting device E. Light passes through an integrator lens 4 for improving condensation efficiency and a peripheral light quantity ratio, and is bent substantially at a right angle by a reflecting mirror 12*a*. The light is divided by a dichroic mirror into three primary colors R, G and B. At first, the light is reflected and separated into the B light by a dichroic mirror 10*a*, which is characterized to reflect only the B light while transmitting the G light and the R light, and is guided through a reflecting mirror 12*b* into a condenser lens 5*a*. The condensed light passes through a liquid crystal panel 8 so that it arrives as the image of the B light at a synthetic prism 11.

The G light and R light having passed through the dichroic mirror 10*a* of the first stage are reflected and separated into the G light by a dichroic mirror 10*b* of a second stage, which is characterized to reflect the G light while transmitting the R light. The G light is condensed into a parallel light by a condenser lens 5*b*, and arrives as the image of the G light at the synthetic prism 11. The R light having passed through the dichroic mirror 10*b* of the second stage is guided through two reflecting mirrors 12*c* and 12*d* into a condenser lens 5*c*, and passes through the liquid crystal panel 8 to arrive as the image of the R light at the synthetic prism 11. Therefore, the three primary colors R, G and B are synthesized into a color image at the synthetic prism 11, and the color image is guided into a projecting lens 9, by which it is suitably enlarged and projected on the front screen S.

Figure 9:
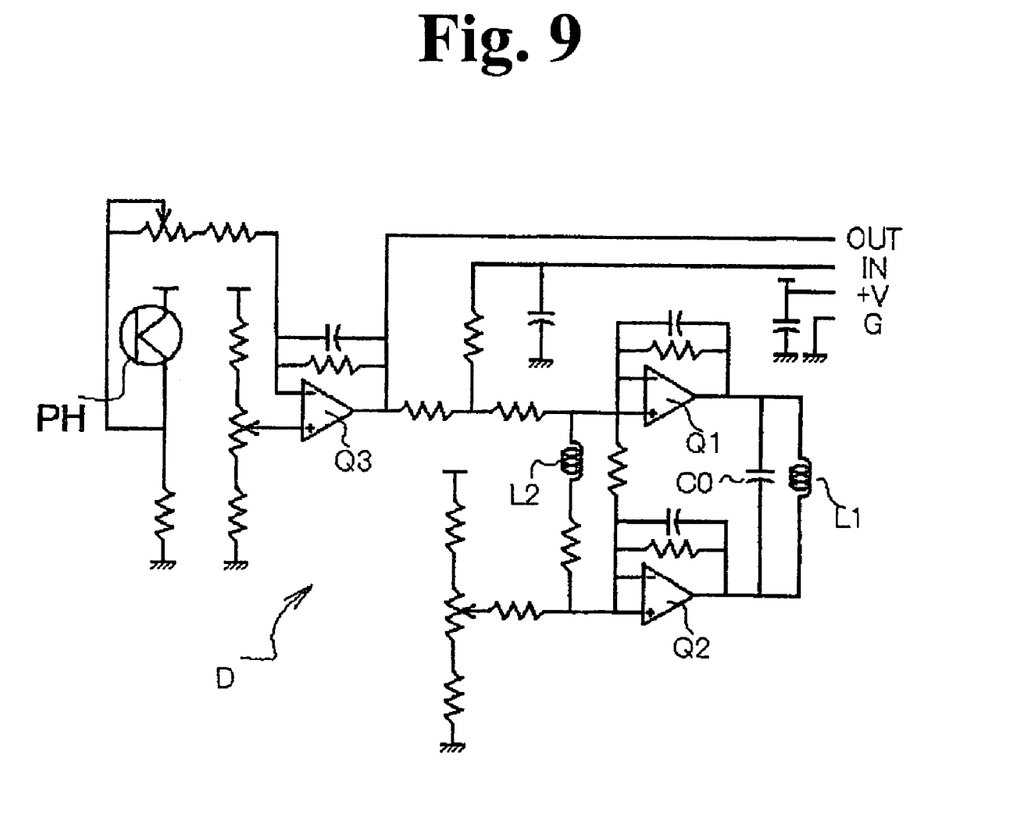
FIG. 9 is a circuit diagram of a light quantity adjusting circuit for driving the light amount adjusting device according to an embodiment of the present invention.

After the light amount adjusting device E adjusts light to have proper brightness, a half-mirror (or dichroic mirror) 50 divides part of light, and a photo-electric sensor (photodiode) 70 receives the part of light through a condenser lens 50. A light quantity adjusting circuit shown in FIG. 9 compares an output of the photo-electric sensor (photodiode) 70 with proper quantity of light directly detected by a CPU in a main device upon detecting. Base on a result of the comparison, the light amount adjusting device E is controlled to adjust light to have proper brightness.

Figure 3:
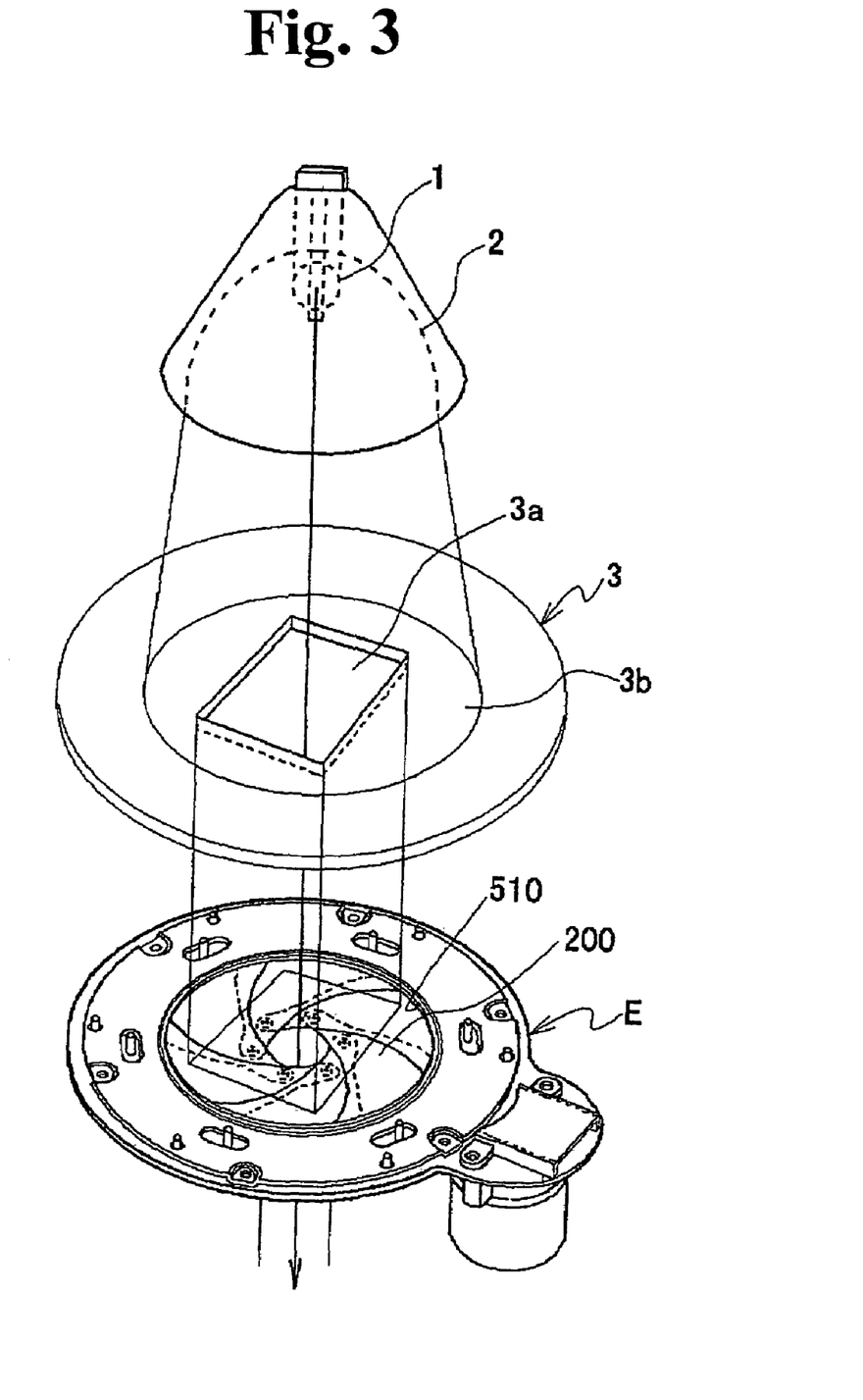
FIG. 3 is a view showing a light amount adjusting device according to an embodiment of the present invention.

With reference to FIG. 3, here will be explained the arrangement relations among the light source 1, the filter 3 and the light amount adjusting device E. In FIG. 3, reference numeral 1 designates the light source, reference numeral 2 designates the paraboloidal reflecting mirror, reference numeral 3 designates the filter, and symbol E designates the light amount adjusting device. The luminous flux emitted from the light source 1 irradiates the filter 3 such that it is reflected and condensed by the paraboloidal reflecting mirror 2. The filter 3 cuts the infrared ray and the ultraviolet ray as described above, and a remaining surface thereof is coated with a reflecting coating to form a rectangular area 3*a* at a central portion thereof for transmitting the light. Therefore, the luminous flux emitted is cut at its peripheral light unnecessary for the screen projection by the rectangular area 3*a*, and irradiates the light amount adjusting device E. The light amount adjusting device E has an optical path opening 510 so that blade member 200 is larger than the diameter at the full open time and the maximum aperture of the blade member 200 is made smaller than the rectangular area 3*a*.

The light amount adjusting device E arranged in the optical path from the light source 1 to the integrator lens 4 through the filter 3 will be explained in more detail. The light amount adjusting device E includes a substrate 500 with an optical path opening 510 so that light from the light source 1 passes through; the blade member 200 attached to the substrate so that a tip portion thereof faces the optical path opening 510; a transmission member 400 for opening and closing the blade member 200; and a drive device 700 for driving the transmission member 400.

The blade member 200 will be explained. The blade member 200 faces the optical path opening 510 to change an opening thereof, thereby adjusting quantity of light passing through. Accordingly, the blade member 200 is formed in a flat shape covering the opening formed in the substrate, and is supported on a guide to be slidable. The blade member 200 is formed of a synthetic resin film punched out in a proper shape. The light source lamp in the projector is heated up to 200 degrees, so that a material of the blade member is selected to have a small change in a temperature.

Figure 8A:
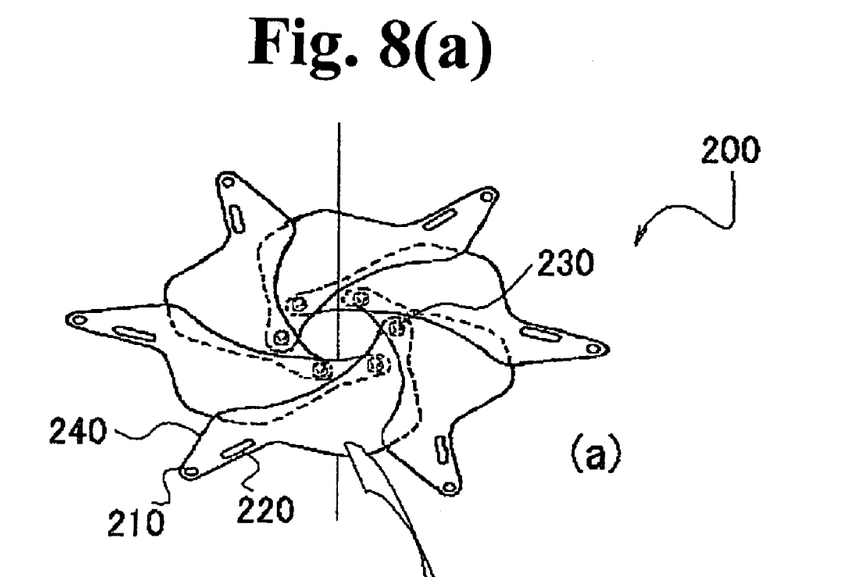
FIG. 8(a) is a view showing the blade member in an overlapped state.
Figure 8B:
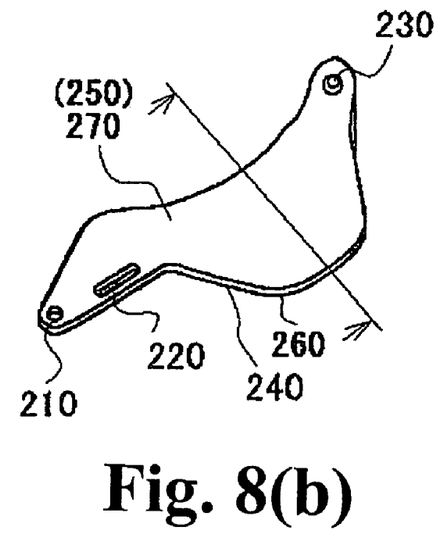
FIG. 8(b) is a view showing a shape of the blade member.
Figure 8C:
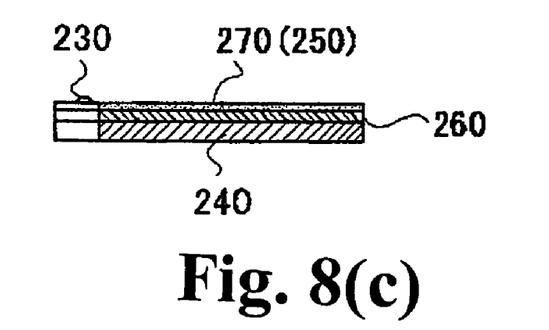
FIG. 8(c) is a sectional view showing the blade member.

In the embodiment, it is possible to reduce a weight as compared with a blade member made of metal. Further, as shown in FIGS. 3 and 8, the blade member 200 is formed of a heat resistant sheet 240 made of a polyimide sheet or a polyester sheet withstanding heat of the light source 1. The heat resistant sheet 240 is coated with a light blocking material. Accordingly, it is possible to withstand high heat without excess deformation, so that the light amount adjusting device E operates smoothly to adjust quantity of light.

Figure 7A:
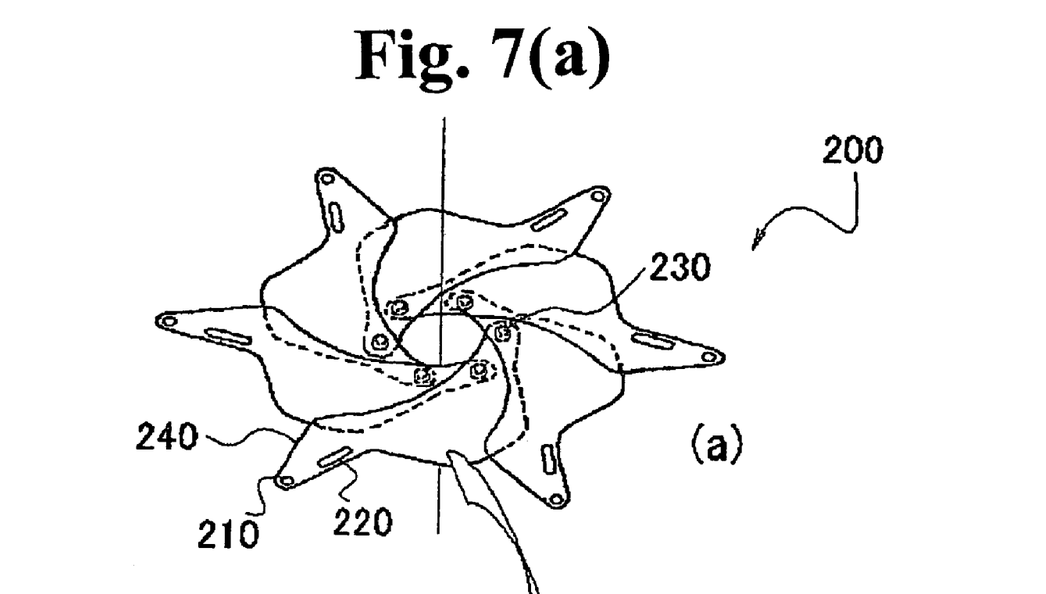
FIG. 7(a) is a view showing the blade member in an overlapped state.
Figures 7B, 7C:
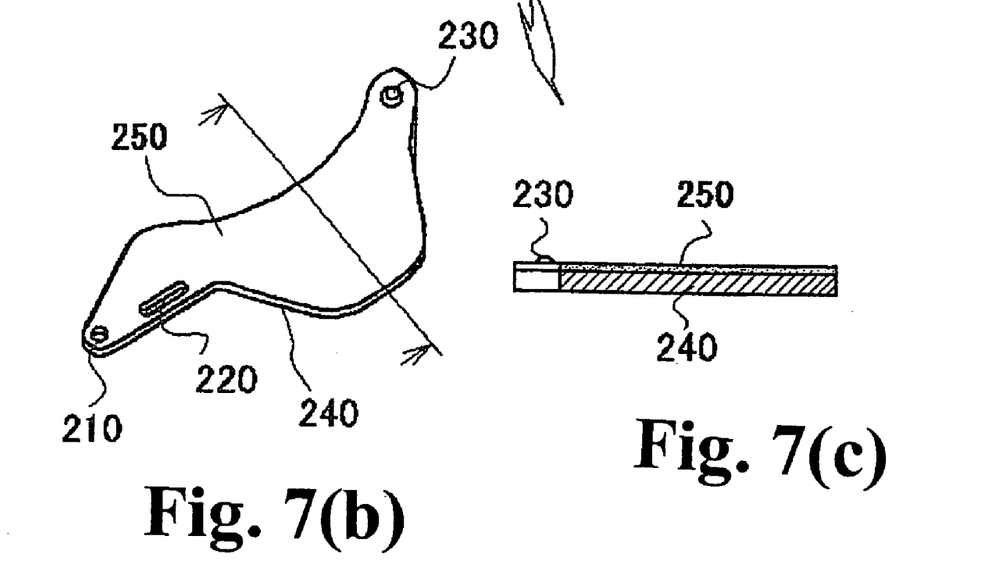
FIG. 7(b) is a view showing a shape of the blade member.
FIG. 7(c) is a sectional view showing the blade member.

As shown in FIG. 7, the blade member 200 is formed of the heat resistant sheet 240 made of a polyimide sheet or a polyester sheet withstanding heat of the light source 1. The heat resistant sheet 240 is coated with black paint 250 as the light blocking material. The sheet is punched out in a proper shape. The shape includes a wing shape having a base supported on the substrate and a tip facing the optical path opening 510, so that the tip changes the opening area as designed.

Instead of the black painting, as shown in FIG. 8, the blade member may be formed of a sheet material in which at least one surface of the heat resistant sheet 240 is coated with a metal layer 260 such as copper. Alternatively, a polyimide resin or a polyester resin may be coated on the metal layer 260. Further, a layer 270 such as nickel and nickel chrome covers the metal layer 260.

A shape thereof may be a rectangular with a base portion supported on the substrate and a tip portion face the optical path opening 510. The tip portion is formed so as to change an area of the opening to a specific designed value.

When the blade member is formed of a single member, an opening is formed in the tip for adjusting quantity of light. When the blade member is formed of two members, a semicircular opening is formed in each of tips, so that the two members rotate in opposite directions to reduce or increase the opening area. When the blade member is formed of more than three members, the members are arranged along a peripheral edge of the optical path opening 510 with an equal interval, so that edges of the members are overlapped. In the embodiment, six blade members 200 are overlapped as shown in FIGS. 7 and 8 such that a circular opening is formed at a center of the tips of the blades. Each of the blade members is provided with a fitting hole 210 for engaging a support pin 530 and a slit 220 for engaging the transmission member 400.

The blade members 200 have protrusions 230 at the tip portions thereof overlapped with each other for reducing friction between the overlapped tip portions to reduce noise upon opening and for operating smoothly with a small driving force.

A mechanism for driving the substrate and the blades will be explained with reference to FIG. 4. The blade members 200 are supported between a pair of substrates facing each other with a specific interval for adjusting a diameter of the opening formed in the substrate from a full opened state to a specific aperture as in a camera. The substrate is formed of a bottom plate 500 and a presser plate 100. The bottom plate 500 is provided with the transmission member 400 for opening and closing the blade members 200 and the drive motor 700. That is, the circular bottom plate 500 is provided with the blade members 200, the transmission member 400 for opening and closing the blade members 200, and the drive motor 700 for driving the transmission member 400, respectively, and the presser plate 100 is attached to the bottom plate 500, so that the components described above are held between the bottom plate 500 and the presser plate 100. The blade members 200 do not fully close the opening, so that heat of the light source is not confined, thereby preventing an increase in a temperature. Accordingly, it is possible to use the blade members 200 formed of the heat resistant sheet such as the polyimide sheet or the polyester sheet. The blade members 200 is formed of the heat resistant sheet such as the polyimide sheet or the polyester sheet to provide lightweight as compared with a blade member made of metal, thereby operating at a high speed with low noise and obtaining durability.

The bottom plate 500 is provided, at its center, with the optical path opening 510 and, on the outer concentric circle of the optical path opening 510, with a groove 520, on the bottom of which a protruding guide rail 525 is formed to support the ring plate (the transmission member) 400 rotatably. The bottom plate 500 is provided with: support pins 530 individually embedded at equally divided positions on the outer concentric circle for providing the turning centers of the blade member 200; stop holes 550 formed near the individual support pins 530 at such positions for screwing the presser plate 100 not to obstruct the operation of the blade members 200; and a supporting portion 540 having stop holes 542 for supporting the drive device 700, a relief hole 544, and a sector slit 546, through which the operation pin 620 of the activation lever 600 penetrates. The support pins 530 with the identical shape have an identical function so that their reference numerals are omitted.

The transmission member 400 is provided with an opening 410 at its center, and is rotatably fitted in the groove 520 of the bottom plate 500. The transmission member 400 is further provided with: operation pins 420 embedded on the ring face at circumferentially equally divided positions for rotating the blade members 200; an arm 430 protruding to the side of the supporting portion 540 of the bottom plate 500; and a slit 440 formed in the leading end portion of the arm 430 for engaging an operation pin 620 of an activation lever 600. The blade member 200 is formed of the plural (in the embodiment, six) blade members. Each blade member is provided: at its end portion, with a fitting hole 210 for fitting the support pin 530 of the bottom plate 500 for turning motions; a slit 220 for fitting the operation pin 420 of the transmission member 400; and, at the leading end portion, a protrusion 230 for supporting the blade member at a predetermined spacing. In the components shown in FIG. 4, the identical shapes have the identical functions so that their reference numerals are omitted.

The presser plate 100 is formed in a ring shape and provided at its center with an optical path opening 110 having a diameter equivalent to that of the optical path opening 510 of the bottom plate 500. The presser plate 100 is further provided with: mounting portions 120 for fixing the transmission member 400 and the blade members 200 on the bottom plate 500 at a predetermined spacing from the bottom plate 500 so as to hold and protect them rotatably with respect to the bottom plate 500; relief slits 130 for the operation pins 420 of the transmission member 400; and relief holes 140 for the support pins 530 of the bottom plate 500. The activation lever 600 is provided with a fitting hole 610 on one end thereof for fitting and fixing a spindle 710 of the drive device 700 and the operation pin 620 on the other end thereof. The operation pin 620 is fitted in the slit 440 of the transmission member 400 to transmit the drive of the drive device 700 to the transmission member 400.

Figure 5:
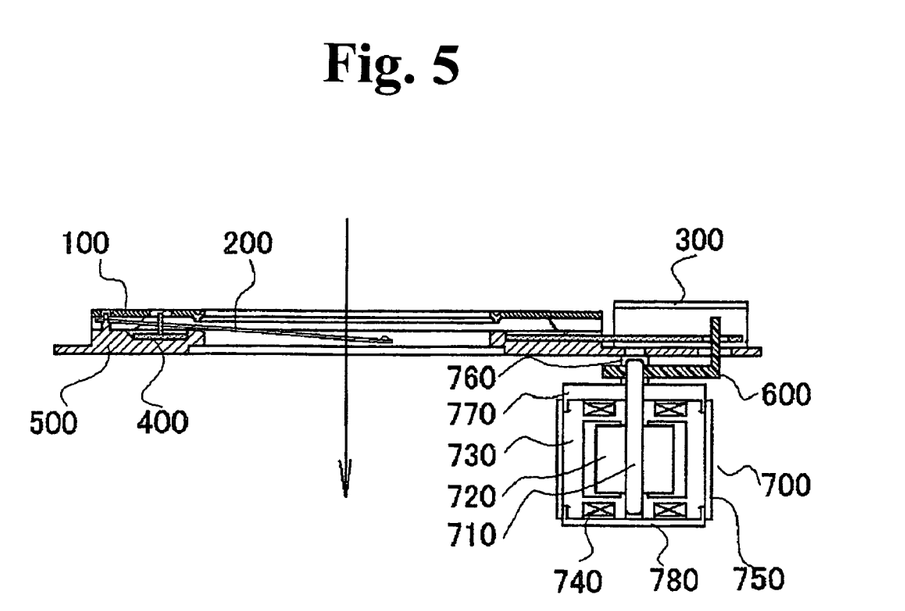
FIG. 5 is a side sectional view of the light amount adjusting device shown in FIG. 4.

With reference to FIG. 5, the drive device 700 is provided with: the spindle 710 fitted on the outer center of the activation lever 600; a magnet rotor 720, through which the spindle 710 extends; a coil frame 730 split into halves vertically or transversely of the spindle 710 for supporting the magnet rotor 720 rotatably; a conduction coil 740 wound on the outer circumference of the coil frame 730; a yoke 750 for cutting magnetic influence from the outside; covers 770 and 780; and a fixed portion 760 molded integrally with the cover 770 and fixed and supported by the bottom plate 500. Various kinds of electromagnetic motors can be adopted as the drive device 700. In the embodiment, an exciting coil is wound around the magnet rotor 720 in a direction perpendicular to the direction of the magnetic pole of the magnetic rotor 720, so that the magnetic rotor 720 is turned by a predetermined angle through a magnetic field by applying an electric current to the exciting coil. The magnetic rotor 720 is rotated clockwise or counter-clockwise according to the direction of the electric current applied.

By winding a drive coil and a brake coil on the coil frame 730 and applying the electric current in opposite directions, the rotor can also be rotated by the drive coil and stopped by the brake coil. By burying a PH (photo-electric sensor) in the coil frame 730 at one or more portions, moreover, the magnetic poles (or magnetic fields) of the rotor can be detected to locate an angular position of the rotor. As a result, the blade members are turned in the predetermined direction by energizing the drive coil, and are precisely stopped at predetermined positions by energizing the brake coil with detection of their angular positions with the PH (photo-electric sensor). Thus, the light quantity is adjusted to large and small values by the aperture formed by the blade members.

The protective cover 300 is provided for protecting the connected relation between the arm 430 of the transmission member 400, which is not covered with the presser plate 100 and exposed, and the operation pin 620 of the activation lever 600. The protective cover 300 is mounted on the bottom plate 500 together with the drive device 700 by means of stop screws 310.

A process for assembling the light quantity adjusting unit formed of six blade members shown in FIG. 4 will be described next. At first, the transmission member 400 is fitted and set in the groove 520 of the bottom plate 500 in a state shown in FIG. 4. The first light quantity adjusting blade member A1 of the blade member 200 is placed over the transmission member 400 by fitting the fitting hole 210 on the support pin 530 of the bottom plate 500, as positioned at the confronting position, and by fitting the slit 220 on the operation pin 420 of the transmission member 400. Likewise, the second light quantity adjusting blade member A2, the third light quantity adjusting blade member A3, the fourth light quantity adjusting blade member A4 and the fifth light quantity adjusting blade member A5 are laid sequentially in the recited order over the first light quantity adjusting blade member A1. Likewise, the sixth light quantity adjusting blade member A6 is laid over the fifth light quantity adjusting blade member A5 such that its leading end goes below the light quantity adjusting blade member A1.

Figure 4:
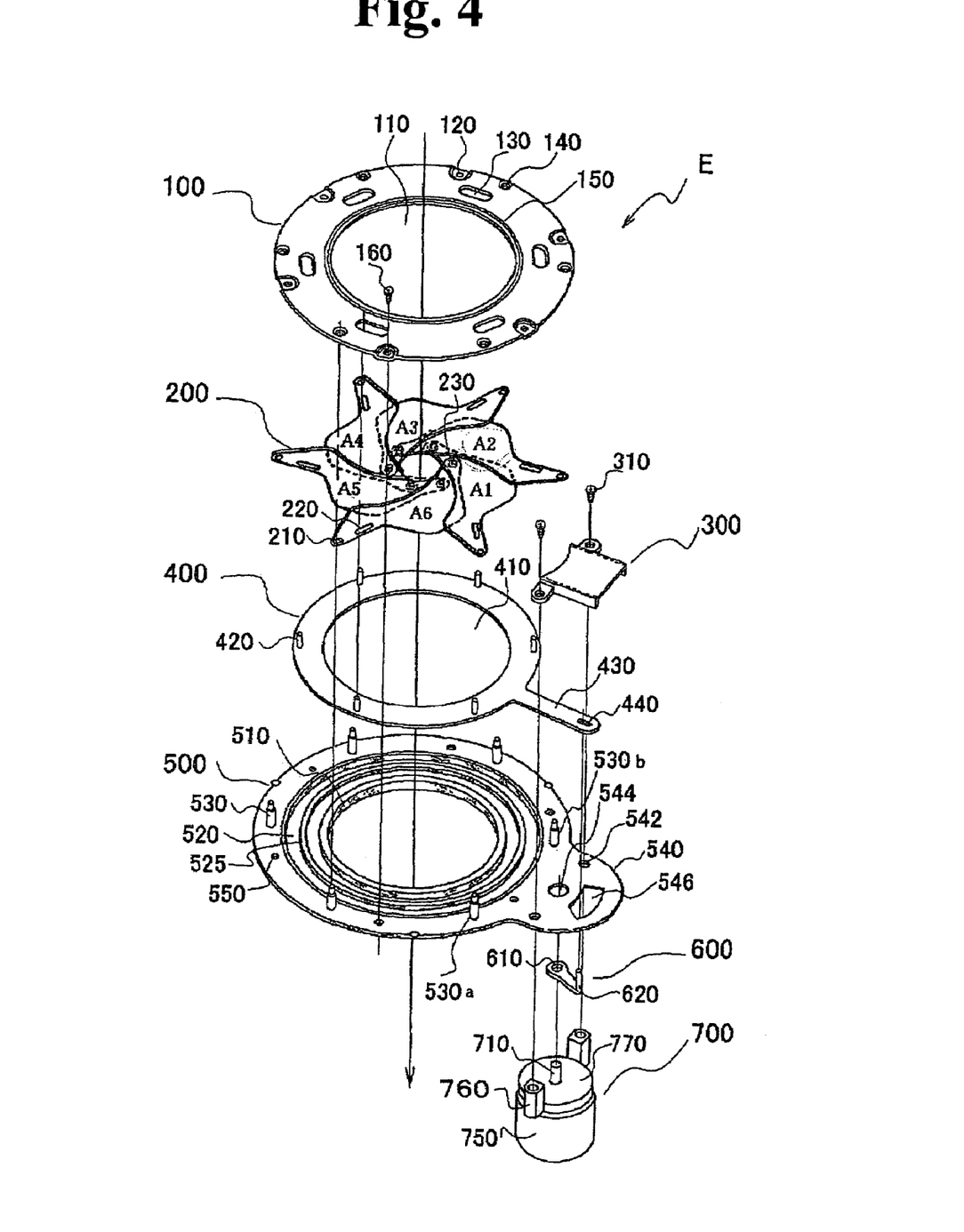
FIG. 4 is an exploded view of the light amount adjusting device shown in FIG. 3.

In the case of the six light quantity adjusting blade members as shown in FIG. 4, the first blade A1 is supported at its root end portion on a support pin 530a on the bottom plate (or substrate) 500, so that its leading end portion confronts the optical path opening 510. Next, the second blade A2 is supported on the support pin 530b, so that its leading end confronts the optical path opening 510. At this time, the inner side edge portion of the second blade A2 is laid over the outer side edge portion of the first blade A1 (FIG. 4). Likewise: the third blade A3 is laid over the second one A2; the fourth blade A4 is laid over the third one A3; and the fifth blade A5 is laid over the fourth one A4. The inner side edge portion of the last sixth blade A6 is laid over the fifth one A5, and the outer side edge portion of the same is laid below the first blade A1. When the blades are thus sequentially laid up, the last blade is laid at its one side edge below the first blade, so that the plural blades are combined and bound in the bundled state. Even when an external force such as an impact is exerted on the apparatus, the blades do not flutter to leak light from a clearance between the blades.

Next, the presser plate 100 is fastened downwardly in the state at its six portions by means of stop screws 160 thereby to complete the light quantity adjusting unit. Specifically, the individual blade members are supported between the bottom plate 500 and the presser plate 100 to be freely opened/closed (or turned), and the base plate is constructed of the individual flat members, i.e., the bottom plate 500 and the presser plate 100. A process of assembling the drive device 700 will be described next with reference to FIG. 5. First, the rotor, which is inserted in advance by insert-molding the spindle 710 and the inter-molded magnet rotor 720, is rotatably enveloped by the vertically or transversely halved coil frame 730 having the conductive coil 740 wound in the outer circumference groove, and the yoke 750 is fitted between the cover 770 and the cover 780. The activation lever 600 is fitted and fixed at the proper position of the spindle 710 thereby to complete the drive device 700.

As shown in FIG. 4, the operation pin 620 of the activation lever 600 attached to the drive device 700 is fitted in the slit 440 of the transmission member 400, which is positioned at the supporting portion 540 of the bottom plate 500 for supporting the drive device 700. The protective cover 300 is mounted and fixed from the opposite face, which confronts the transmission member 400 with respect to the supporting portion 540, on the bottom plate 500 together with the fixed portion 760 of the drive device 700 by means of the stop screws 310, thereby to complete the light amount adjusting device shown in FIG. 5.

At least one of the bottom plate 500 forming the aforementioned substrate and the presser plate 100 is provided with a guide surface for regulating (or guiding) the motions of the blades, so that the blades may be opened/closed along the guide surface. The guide surface includes a first guide surface formed on the circumferential edge (or near) the support pin, and a second guide surface formed on the circumference edge portion of the optical path opening, so that a level difference is formed of one guide surface higher than the other in a direction perpendicular to the optical path. The level difference is made by forming the substrate surface into a sloped plane or a stepped plane. As a result, each blade member is opened and closed at an inclined state by a predetermined angle with respect to the optical path.

When one of the first guide surface and the second guide surface is formed at a higher level on the bottom plate and the presser plate, the other is formed at a lower level. An assembled state of the blade member 200 will be explained with reference FIG. 6(b). At first, a leading end of the circumference edge portion of the groove 520 forming the optical path opening 510 contacting the blade member 200 protrudes by a height h1 with respect to a plane reference X-X of the bottom plate 500. A step portion of the portion, in which the support pin 530 is embedded, contacting the blade member 200 protrudes by a height h2 (h2>h1) with respect to the plane reference X-X.

Figures 6A, 6B:
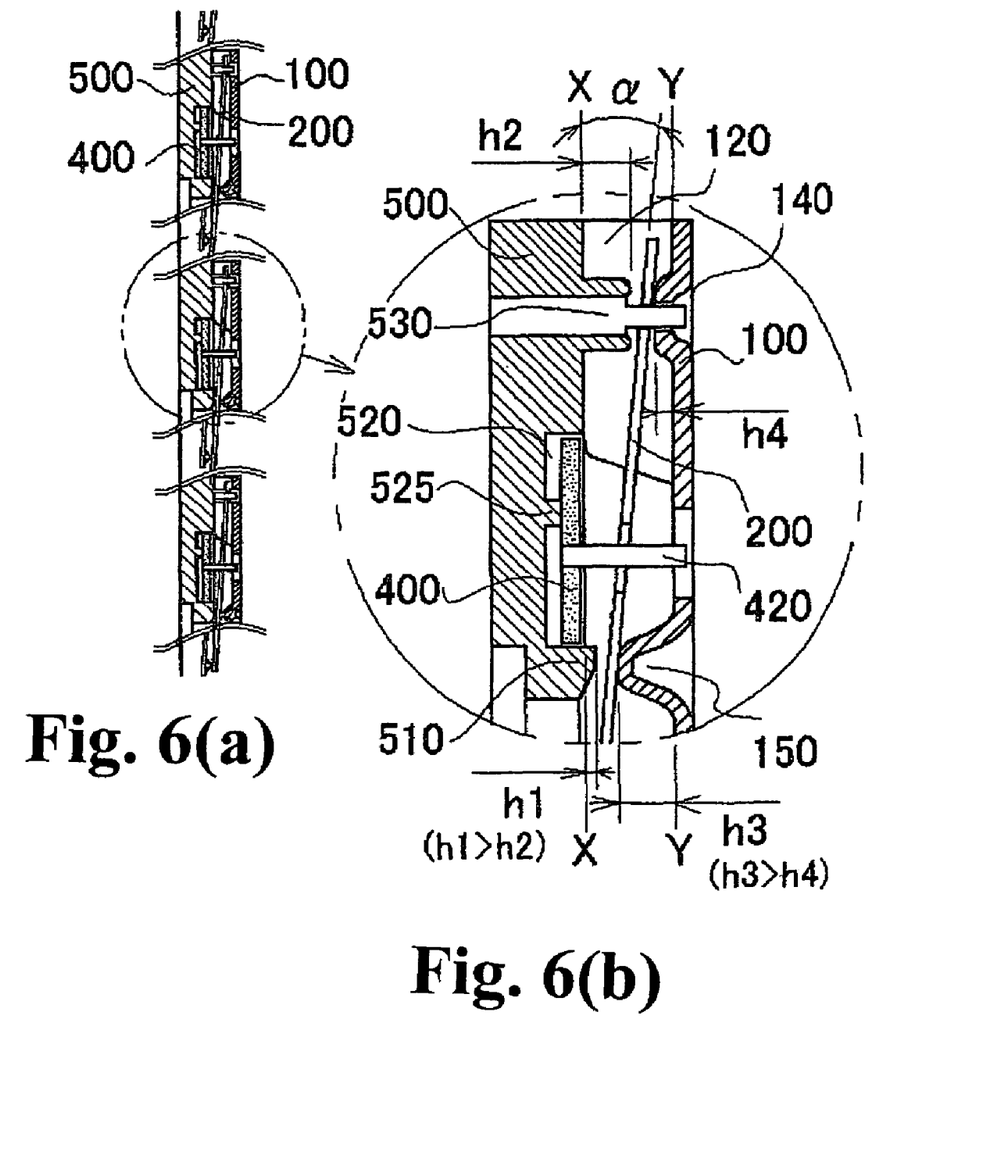
FIG. 6(a) is a side view of the light amount adjusting device in an assembled state.
FIG. 6(b) is an enlarged view showing a part of the light amount adjusting device.

A leading end portion of a regulating protrusion 150 confronting the protruding leading end of the circumference edge portion of the bottom plate 500 contacting the blade member 200 protrudes by a height h3 with respect to a plane reference Y-Y of the presser plate 100 in parallel with the plane reference X-X. A leading end portion of the relief hole 140 fitting the support pin 530 contacting the blade member 200 protrudes by a height h4 (h4>h3) with respect to the plane reference Y-Y. An arbitrary plane is determined when three points are given. The first point for determining the plane of each light quantity adjusting blade member is located at the step portion of the portion, in which the support pin 530 contacting the blade member is embedded. The second point is located at a protruding leading end portion of the circumference edge portion of the bottom plate 500 contacting the edge portion of the same blade member. The third point is located at an edge portion of the same blade member contacting the plane of the blade member on the closer side.

The light quantity adjusting blade members of the blade member 200 are set at positions on the bottom plate 500 in an inclined state at an equal angle α in different directions, so that they turn on the individually different planes. As a result, the six light quantity adjusting blade members of the blade member 200 turn without any contact while being held with a specific space, so that their contacting portions can be drastically reduced to suppress noise caused when their surfaces contact and rub each other.

Next, an example of a control circuit for driving the light amount adjusting device E will be explained with reference to FIG. 9. At first, a circuit configuration of the light quantity adjusting circuit D of the light amount adjusting device E will be explained with reference to FIG. 9. In FIG. 9: symbol IN designates an input terminal for a light quantity adjusting signal output from a control circuit (not shown) of the projector. Symbol OUT designates an output terminal of a light quantity adjusting level signal according to the light quantity adjusting level when the light amount adjusting device E is operated. Symbol +V designates an applied voltage of the light quantity adjusting circuit D; symbol G designates a grounding terminal; and symbols Q1 to Q3 designate differential amplifiers. The PH (photo-electric sensor 70) is a photo-electric sensor arranged at a position to confront the magnet rotor 720 of the drive device 700 in the light amount adjusting device E shown in FIG. 5 for detecting the light quantity adjusting position using a change in magnetic characteristics of the rotational position of the magnet rotor 720.

Symbol L1 designates the drive coil shown in FIG. 5, and symbol L2 designates the brake coil. Symbol C0 designates a capacitor (a bypass filter or high-pass filter) connected between two ends of the drive coil L1 for suppressing a change just after the start of the feed of the drive current to the drive coil L1 thereby to lower the light quantity adjusting rate of the light amount adjusting device E. The remaining resistors and capacitors may be individually arranged at such suitable positions to operate the light quantity adjusting circuit D properly. In a drive control of the light amount adjusting device E, at first, a light quantity adjusting signal for adjusting the quantity of light of the image to be projected is input from the control circuit of the projector H to the input terminal IN. A light quantity adjusting signal of the light amount adjusting device E at that time is detected by the PH (photo-electric sensor 70) and is amplified and output by the operation amplifier Q3.

As a result, the two light quantity adjusting signals are compared at a circuit node E1, and a positive or negative drive current corresponding to a potential difference between the operation amplifier Q1 and the operation amplifier Q2 flows into the drive coil L1 to activate the drive device 700 as shown in FIG. 5. At this time, depending on the magnetic characteristics changing with the rotation of the magnet rotor 720 to the brake coil L2, the braking current according to the change flows into the brake coil L2 thereby to damp the magnet rotor 720 and change the detected output of PH (photo-electric sensor 70). When the potential difference at the circuit node E1 disappears, the drive device 700 stops to stop the blade members 200 at the positions.

During the drive, the change just after the start of the drive current feed to the drive coil L1 is suppressed by the capacitor C0 (a bypass filter or high-pass filter) connected between the two ends of the drive coil L1. Accordingly, the rotation of the drive device 700 is gradually increased, and the blade members 200 are operated smoothly, thereby reducing noise.

A light quantity control in the case that the light amount adjusting device is adopted in the projector shown in FIG. 2 will be explained next. The light amount adjusting device may be controlled to adjust the light quantity according to brightness of environment employed or luminance change of consecutive projected images. When the light quantity is adjusted according to the brightness of the environment, the projector is provided with a photo-electric sensor such as a line sensor or a CCD sensor for detecting ambient light. The photo-electric sensor is mounted on an outer case of the projector thereby to detect the brightness of the room, or a test image having a predetermined luminance is projected on the screen, so that light reflected from the screen may be detected by the photo-electric sensor built in the projector.

The light quantity adjustment is performed on the basis of the quantity of light, which is electrically detected by the photo-electric sensor. For example, the detected value of the ambient light is compared with a predetermined reference value, and a reduction in the light quantity is calculated by an operation circuit such as a CPU, so that the light quantity adjusting signal is transmitted to the light amount adjusting device. In a case that the light quantity adjustment is performed according to the change in the luminance of the projected image, the luminance is calculated from the image signal transmitted to the image forming unit and is compared with a reference value, so that the light quantity adjusting signal is transmitted to the light amount adjusting device.

In the light amount adjusting device, the electric current is applied to the exciting coil (i.e., the drive coil and the brake coil) as described above, so that the blade members move to predetermined positions. The plural blade members are individually arranged at an equal spacing or at a predetermined spacing in the optical path opening of the substrate (i.e., the bottom plate and presser plate), so that they can turn around their root end portions on the support pins. Thus, the blade members turn along their guide surfaces formed on the substrate. With these turns, the leading end portions of the individual blade members confront the optical path opening to enlarge or reduce the aperture. At this time, in the shown embodiment, the substrate for supporting the individual blade members is provided with the blade guide surfaces having the slopes or steps of the level differences in the direction perpendicular to the optical path, so that the individual blade members turn along the guide surfaces while being inclined at the predetermined angle.

In the embodiment, the light amount adjusting device E is provided with the six blades. The blade members 200 may be used in a light amount adjusting device with other configurations. For example, such a light amount adjusting device may include a transmission member movably supported on outside an optical path opening of a substrate; and a pair of blade members supported on the substrate and the transmission member for moving vertically or laterally, or in a direction of light relative to the optical path opening to adjust quantity of light.

Further, the blade members 200 are inclined relative to the transmission member 400, and may not be inclined depending on a specification.

In order to obtain the objects described above, according to the first aspect of the present invention, (1) the blade member is formed of a polyimide sheet or a polyester sheet having heat resistance withstanding heat of the light source. The light blocking material is laminated on the base member. Accordingly, it is possible to reduce a weight as compared with a conventional blade member made of metal. The blade member withstands heat of the light source and does not deform, thereby smoothly operating to adjust quantity of light.

(2) According to the second aspect of the present invention, in the first aspect, the light blocking material includes a black coating coated on at least one surface of a heat resistant sheet, thereby obtaining good light blocking ability like a conventional blade member.

(3) According to the third aspect of the present invention, in the second aspect, the light amount adjusting device is disposed in the projection device, thereby preventing reflection of light on a surface of the blade member and ghost phenomenon due to the reflection.

(4) According to the fourth aspect of the present invention, in the first aspect, the light blocking material includes a metal layer such as cupper coated on at least one surface of a heat resistant sheet, thereby providing the light amount adjusting device with good light blocking ability.

(5) According to the fifth aspect of the present invention, in the fourth aspect, the light blocking material includes the metal layer such as cupper coated on at least one surface of the heat resistant sheet. The metal layer is coated with a polyimide resin, a polyester resin, an oxide layer such as nickel oxide, or a black coating, thereby providing the light amount adjusting device with good light blocking ability. The metal layer appears on a side surface of the slit connected to the drive device to form a connection surface with the drive device, thereby preventing wear and improving durability.

(6) According to the sixth aspect of the present invention, in the fourth aspect, the metal layer of the light amount adjusting device faces the light source, and the light amount adjusting device is arranged to face the light source. Accordingly, it is possible to reflect heat from the light source, thereby decreasing a temperature of the blade member and improving heat resistance of the light amount adjusting device.

(7) According to the seventh aspect of the present invention, in the first aspect, the light amount adjusting device includes a transmission member rotatably supported on the substrate and having an opening arranged coaxially with the optical path opening and the blade member supported on the substrate and the transmission member for blocking the optical path opening of the substrate to adjust quantity of light. Accordingly, the light amount adjusting device is formed in a circle shape similar to that of an optical system, thereby adjusting quantity of light within a limited space.

(8) According to the eighth aspect of the present invention, in the seventh aspect, the blade member includes a plurality of blade portions arranged and overlapped around a peripheral of the transmission member with a constant space therebetween. The blade portions are rotatably supported on the substrate with a predetermined space therebetween. Accordingly, heat from the light source is not confined between the blade members, thereby improving heat resistance of the light amount adjusting device.

(9) According to the ninth aspect of the present invention, in the seventh aspect, the blade member includes a plurality of blade portions arranged and overlapped around a peripheral of the transmission member with a constant space therebetween. A top one of the blade portions has a tip portion arranged below a tip portion of a bottom one of the blade portions. Accordingly, in the light amount adjusting device, it is possible to uniformly reduce the aperture from the surrounding. Further, the blade members are held without an excess space therebetween, thereby making quantity of light uniform.

(10) According to the tenth aspect of the present invention, in the seventh aspect, the blade member is inclined toward a direction of light relative to a mounting surface of the transmission member. Accordingly, it is possible to reflect and scatter light with the surface, so that heat from the light source is not confined in the optical path, thereby reducing deformation of the blade member and deterioration of the light source in the light amount adjusting device.

(11) According to the eleventh aspect of the present invention, in the first aspect, the light amount adjusting device includes a transmission member rotatably supported on the substrate to be movable outside the optical path opening and a pair of blade members supported on the substrate and the transmission member for blocking the optical path opening of the substrate in a vertical direction, a lateral direction, or a light direction to adjust quantity of light. Accordingly, it is easy to connect the transmission member to the pair of blade members. Further, it is possible to provide the transmission member on one side of the optical path opening, thereby making the device small.

(12) According to the twelfth aspect of the present invention, a projector includes a light source, a projection device for projecting light from the light source on a screen through an image forming panel, and a light amount adjusting device arranged in the projection device or between the projection device and the light source. The light amount adjusting device includes a substrate having an optical path opening so that light from the light source passes therethrough; a blade member for adjusting quantity of light passing through the optical path opening; and a driving device for opening and closing the blade member. The blade member includes a base member formed of a polyimide sheet or a polyester sheet having heat resistance withstanding heat of the light source. A light blocking material is laminated on the base member. Accordingly, it is possible to reduce a weight as compared with a conventional blade member made of metal. The blade member withstands heat of the light source and does not deform, thereby smoothly operating to adjust quantity of light.

(13) According to the thirteenth aspect of the present invention, in the twelfth aspect, the light blocking material includes a black coating coated on at least one surface of a heat resistant sheet, thereby obtaining good light blocking ability like a conventional blade member.

(14) According to the fourteenth aspect of the present invention, in the thirteen aspect, the light amount adjusting device is disposed in the projection device, thereby preventing reflection of light on a surface of the blade member and ghost phenomenon due to the reflection.

(15) According to the fifteenth aspect of the present invention, in the twelfth aspect, the light blocking material includes a metal layer such as cupper coated on at least one surface of a heat resistant sheet, thereby providing the light amount adjusting device with good light blocking ability.

(16) According to the sixteenth aspect of the present invention, in the fifteenth aspect, the light blocking material includes the metal layer such as cupper coated on at least one surface of the heat resistant sheet. The metal layer is coated with a polyimide resin, a polyester resin, an oxide layer such as nickel oxide, or a black coating, thereby providing the light amount adjusting device with good light blocking ability. The metal layer appears on a side surface of the slit connected to the drive device to form a connection surface with the drive device, thereby preventing wear and improving durability.

(17) According to the seventeenth aspect of the present invention, in the fifteenth aspect, the metal layer of the light amount adjusting device faces the light source, and the light amount adjusting device is arranged to face the light source. Accordingly, it is possible to reflect heat from the light source, thereby decreasing a temperature of the blade member and improving heat resistance of the light amount adjusting device.

(18) According to the eighteenth aspect of the present invention, in the twelfth aspect, the light amount adjusting device is arranged to change the optical path opening of the substrate between a fully opened state to a specific aperture to adjust quantity of light. Accordingly, the blade member does not fully close the optical path, so that heat from the light source is not confined between the light amount adjusting device and the light source, thereby improving durability of the light amount adjusting device.

What is claimed is:

1. A light amount adjusting device to be assembled in a projector having a light source and a projection device projecting light from the light source on a screen through an image forming panel and to be arranged between the light source and the projection device, comprising:
   a substrate having an optical path opening so that light from the light source passes therethrough,
   a blade member for adjusting quantity of light passing through the optical path opening, said blade member including a base member formed of a polyimide sheet or a polyester sheet having heat resistance withstanding heat of the light source and laminated with a light blocking material, and
   a driving device for opening and closing the blade member,
   wherein the light blocking material includes a metal layer including copper coated on at least one surface of the base member.

2. A light amount adjusting device according to claim 1, wherein said light blocking material includes a black coating coated above at least one surface of the base member.

3. A light amount adjusting device according to claim 2, wherein said light amount adjusting device is disposed in the projection device.

4. A light amount adjusting device according to claim 1, said light blocking material includes the metal layer including copper coated on the at least one surface of the base member, said metal layer being coated with a polyimide resin, a polyester resin, an oxide layer including nickel oxide, or a black coating.

5. A light amount adjusting device according to claim 1, wherein said at least one surface of the light amount adjusting device coated with the metal layer faces the light source, said light amount adjusting device being arranged to face the light source.

6. A light amount adjusting device according to claim 1, further comprising a transmission member rotatably supported on the substrate and having an opening arranged coaxially with the optical path opening, said blade member being supported on the substrate and the transmission member for blocking the optical path opening to adjust quantity of light.

7. A light amount adjusting device according to claim 6, wherein said blade member includes a plurality of blade portions arranged and overlapped around a peripheral of the transmission member with a constant space therebetween, said plurality of the blade portions being rotatably supported on the substrate with a predetermined space therebetween.

8. A light amount adjusting device according to claim 6, wherein said blade member includes a plurality of blade portions arranged and overlapped around a peripheral of the transmission member with a constant space therebetween, one of said blade portions at a top having a tip portion arranged below a tip portion of another one of the blade portions at a bottom.

9. A light amount adjusting device to be assembled in a projector having a light source and a projection device projecting light from the light source on a screen through an image forming panel and to be arranged between the light source and the projection device, comprising:
   a substrate having an optical path opening so that light from the light source passes therethrough,
   a blade member for adjusting quantity of light passing through the optical path opening, said blade member including a base member formed of a polyimide sheet or a polyester sheet having heat resistance withstanding heat of the light source and laminated with a light blocking material,
   a driving device for opening and closing the blade member, and
   a transmission member rotatably supported on the substrate and having an opening arranged coaxially with the optical path opening, said blade member being supported on the substrate and the transmission member for blocking the optical path opening to adjust quantity of light,
   wherein said blade member is inclined toward a direction of light relative to a mounting surface of the transmission member.

10. A light amount adjusting device according to claim 1, further comprising a transmission member rotatably supported on the substrate to be movable outside the optical path opening, said blade member including a pair of blade portions supported on the substrate and the transmission member for blocking the optical path opening in a vertical direction, a lateral direction, or a direction of light to adjust quantity of light.

11. A projector comprising:
   a light source,
   a projection device for projecting light from the light source on a screen through an image forming panel, and
   a light amount adjusting device arranged in the projection device or between the projection device and the light source, said light amount adjusting device including a substrate having an optical path opening so that light from the light source passes therethrough, a blade member for adjusting quantity of light passing through the optical path opening, and a driving device for opening and closing the blade member, said blade member including a base member formed of a polyimide sheet or a polyester sheet having heat resistance withstanding heat of the light source, said base member being laminated with a light blocking material,
   wherein the light blocking material includes a metal layer including copper coated on at least one surface of the base member.

12. A projector according to claim 11, wherein said light blocking material includes a black coating coated above at least one surface of the base member.

13. A projector according to claim 12, wherein said light amount adjusting device is disposed in the projection device.

14. A projector according to claim 11, wherein said light blocking material includes the metal layer including copper coated on the at least one surface of the base member, said metal layer being coated with a polyimide resin, a polyester resin, an oxide layer including nickel oxide, or a black coating.

15. A projector according to claim 11, wherein said at least one surface of the light amount adjusting device coated with the metal layer faces the light source, said light amount adjusting device being arranged to face the light source.

16. A projector according to claim 11, wherein said light amount adjusting device is arranged to change the optical path opening of the substrate between a fully opened state to a specific aperture to adjust quantity of light.

* * * * *